(12) United States Patent
Yang et al.

(10) Patent No.: US 12,097,577 B2
(45) Date of Patent: Sep. 24, 2024

(54) SPLIT-TYPE MULTIFUNCTIONAL UNDERWATER ARC WELDING POWER SUPPLY AND OPERATING METHOD THEREOF

(71) Applicants: JIANGSU UNIVERSITY OF SCIENCE AND TECHNOLOGY, Jiangsu (CN); NANJING UNIVERSITY OF SCIENCE AND TECHNOLOGY, Jiangsu (CN); JIANGSU AUTOMATION RESEARCH INSTITUTE, Jiangsu (CN)

(72) Inventors: Zhidong Yang, Jiangsu (CN); Yuntao Chen, Jiangsu (CN); Shujin Chen, Jiangsu (CN); Mingxiao Shi, Jiangsu (CN); Chenfu Fang, Jiangsu (CN); Kehong Wang, Jiangsu (CN); Hongwei Sun, Jiangsu (CN); Xiaoyan Gu, Jiangsu (CN)

(73) Assignees: JIANGSU UNIVERSITY OF SCIENCE AND TECHNOLOGY, Jiangsu (CN); NANJING UNIVERSITY OF SCIENCE AND TECHNOLOGY, Jiangsu (CN); JIANGSU AUTOMATION RESEARCH INSTITUTE, Jiangsu (CN)

( * ) Notice: Subject to any disclaimer, the term of this patent is extended or adjusted under 35 U.S.C. 154(b) by 0 days.

(21) Appl. No.: 18/284,294

(22) PCT Filed: Jun. 2, 2022

(86) PCT No.: PCT/CN2022/096881
§ 371 (c)(1),
(2) Date: Sep. 27, 2023

(87) PCT Pub. No.: WO2022/253317
PCT Pub. Date: Dec. 8, 2022

(65) Prior Publication Data
US 2024/0149368 A1 May 9, 2024

(30) Foreign Application Priority Data
Jun. 3, 2021 (CN) .......................... 202110620454.9

(51) Int. Cl.
*B23K 9/10* (2006.01)
*B23K 9/00* (2006.01)
(Continued)

(52) U.S. Cl.
CPC .......... *B23K 9/1043* (2013.01); *B23K 9/0061* (2013.01); *H02M 3/156* (2013.01); *H02M 3/33573* (2021.05)

(58) Field of Classification Search
CPC ...... B23K 9/1043; B23K 9/0061; B23K 9/18; B23K 9/182; B23K 9/186; H02M 3/156;
(Continued)

(56) References Cited

U.S. PATENT DOCUMENTS

2009/0129122 A1  5/2009 Ohashi et al.
2021/0346972 A1* 11/2021 Vogel ...................... H02M 1/42
2022/0048128 A1* 2/2022 Schartner .............. H02M 3/285

FOREIGN PATENT DOCUMENTS

CN       102773582       11/2012
CN       104858530       8/2015
(Continued)

OTHER PUBLICATIONS

Ji-Guang Zhong et al., "New type of power source and wire feeding system for underwater welding", Electric Welding Machine, Dec. 2005, with English abstract, pp. 1-3 and 45, vol. 35, No. 12.
(Continued)

*Primary Examiner* — Dana Ross
*Assistant Examiner* — James F Sims, III
(74) *Attorney, Agent, or Firm* — JCIPRNET (57) ABSTRACT

A split-type multifunctional underwater arc welding power supply including a shore power supply module and an
(Continued)

underwater power supply module is provided. The shore power supply module comprises a shore power supply main circuit unit and a shore power supply control unit. The shore power supply main circuit unit comprises an input filter circuit, an IGBT full-bridge inverter circuit, an intermediate frequency transformer, and an output rectification filter circuit. The underwater power supply module comprises an underwater power supply main circuit unit and an underwater power supply control unit. The shore power supply module is provided on the shore, and the underwater power supply module is carried underwater.

9 Claims, 4 Drawing Sheets

(51) Int. Cl.
*H02M 3/156* (2006.01)
*H02M 3/335* (2006.01)

(58) Field of Classification Search
CPC .... H02M 3/33573; H02M 1/007; H02M 1/36; Y02B 70/10
USPC ................................................... 219/130.33
See application file for complete search history.

(56) References Cited

FOREIGN PATENT DOCUMENTS

| | | |
|---|---|---|
| CN | 207508489 | 6/2018 |
| CN | 113452255 | 9/2021 |

OTHER PUBLICATIONS

"International Search Report (Form PCT/ISA/210) of PCT/CN2022/096881", mailed on Aug. 4, 2022, with English translation thereof, pp. 1-5.

* cited by examiner

SPLIT-TYPE MULTIFUNCTIONAL UNDERWATER ARC WELDING POWER SUPPLY AND OPERATING METHOD THEREOF

CROSS-REFERENCE TO RELATED APPLICATION

This application is a 371 of international application of PCT application serial no. PCT/CN2022/096881, filed on Jun. 2, 2022, which claims the priority benefit of China application no. 202110620454.9, filed on Jun. 3, 2021. The entirety of each of the above-mentioned patent applications is hereby incorporated by reference herein and made a part of this specification.

TECHNICAL FIELD

The present disclosure relates to the technical field of underwater arc welding machine, and specifically relates to a split-type multifunctional underwater arc welding power supply and an operating method thereof.

DESCRIPTION OF RELATED ART

In the 21st century, energy demands are increasingly urgent to humans, and developments of ocean resources gradually become one of important ways for humans to obtain energy. As service time of important offshore structures such as offshore oil platform and various submarine pipelines increases, a plurality of underwater important structures of offshore engineering facilities gradually appear some damages that must be repaired in time. Therefore, connections of underwater steel structural assemblies and repair of in-service steel structural assemblies in offshore engineering cannot be separated from underwater welding technologies, and studies on high-quality and high-efficient underwater arc welding power sources are fundamental scientific research tasks to implement the underwater welding.

So far, most of the underwater arc welding power sources developed and applied domestically and internationally implement the underwater welding by improving structures and properties of arc welding power sources in a land integrated type. Following problems respectively exist according to different positions of an integrated underwater arc welding power source during operation.

(1) The integrated underwater arc welding power supply are arranged on a land and a torch is carried underwater by operators for welding operations. This welding method increases a distance between the integrated underwater arc welding power source and the torch, and has disadvantages such as a slow dynamic response speed (a response time>200 us) and a low control accuracy (large errors of voltage signals and current signals in sampling), ultimately resulting in an unstable welding arc, a large spatter, and many defects. At the same time, the operators are located in a deep ocean and welding parameters can not be adjusted in real-time based on variously changing underwater environment around them, which may also lead to problems of poor welding qualities and unsightly welding seam shapes.

(2) The integrated underwater arc welding power source is arranged in a submersible sealed structure and carried by the operators to conduct welding operations underwater. Although this kind of welding method has a simple welding parameter adjustment and a relatively fast dynamic response speed (the response time<200 us), entire equipment of the integrated underwater arc welding power source is arranged in the submersible sealed structure, resulting in complex designs for sealed structures, bulky volumes, an inconvenient portability, and the like. At the same time, an input voltage at an input terminal of the submersible sealed structure is generally a three-phase alternating current with 380V/50 Hz, which leads to high risks of electric shocks for the operators underwater.

(3) Functions for most of the integrated underwater arc welding power sources are single, which is difficult to satisfy requirements for various underwater welding methods.

SUMMARY

The present disclosure provides a split-type multifunctional underwater arc welding power supply and an operating method thereof to solve technical problems of slow dynamic response speed, high work hazard coefficient, and single function in the prior art.

The present disclosure provides a split-type multifunctional underwater arc welding power supply. The power supply comprises a shore power supply module and an underwater power supply module.

The shore power supply module includes a shore power supply main circuit unit and a shore power supply control unit.

The shore power supply main circuit unit includes an input filter circuit, an IGBT full-bridge inverter circuit, an intermediate frequency transformer, and an output rectification filter circuit. The shore power supply control unit includes a shore power supply digital signal controller, an inverter driving circuit, and an output voltage sampling circuit.

The underwater power supply module includes an underwater power supply main circuit unit and an underwater power supply control unit.

The underwater power supply main circuit includes a chopping circuit, an output filtering circuit; the underwater supply control unit includes an underwater power supply digital signal controller, a booster circuit, a chopping driving circuit, a welding voltage sampling circuit, a welding current sampling circuit, a given voltage setting circuit and a given current setting circuit.

The shore power supply module is arranged on a shore, and the underwater power supply module is carried underwater.

An input power supply, the input filter circuit, the IGBT full-bridge inverter circuit, the intermediate frequency transformer and the output rectification filter circuit are connected in series in turn. The output rectification filter circuit is connected to an input terminal of the output voltage sampling circuit, and an output terminal of the output voltage sampling circuit is connected to the shore power supply digital signal controller; an output terminal for control signals of the shore power supply digital signal controller is connected to an input terminal of the inverter driving circuit, an output terminal of the inverter driving circuit is connected to a controlled terminal of the IGBT full-bridge inverter circuit; an output terminal of the output rectification filter circuit is respectively connected to an input terminal of the chopping circuit and an input terminal of the booster circuit; an output terminal of the chopping circuit is connected to an input terminal of the output filter circuit, and an output terminal of the output filter circuit is connected to a torch and a workpiece; an output terminal of the booster circuit is connected to the torch and the workpiece; the torch and the workpiece are respectively connected to an input terminal of the welding voltage sampling circuit and an input terminal of the welding current sampling circuit; an output terminal of the welding voltage sampling circuit, an output terminal of the welding current sampling circuit, an output terminal of the given voltage setting circuit and an output terminal of the given current setting circuit are all connected to the underwater power supply digital signal controller; the output terminal for control signals of the underwater power supply digital signal controller is connected to an input terminal of the chopping driving circuit; an output terminal of the chopping driving circuit is respectively connected to a controlled terminal of the chopping circuit and a controlled terminal of the booster circuit; and the shore power supply digital signal controller is communicatively connected to the underwater power supply digital signal controller.

Further, the shore power supply control unit further includes an input voltage anomaly detection circuit, an IGBT transistor anomaly detection circuit, an output voltage anomaly detection circuit; an input terminal of the input voltage anomaly detection circuit is connected to the input filter circuit; an input terminal of the IGBT transistor anomaly detection circuit is connected to the IGBT full-bridge inverter circuit; an input terminal of the output voltage anomaly detection circuit is connected to the output voltage sampling circuit; and the shore power supply digital signal controller is respectively connected to an output terminal of the input voltage anomaly detection circuit, an output terminal of the IGBT transistor anomaly detection circuit and an output terminal of the output voltage anomaly detection circuit.

Further, the underwater power supply control unit further includes a chopping circuit anomaly detection circuit; an input terminal of the chopping circuit anomaly detection circuit is connected to the chopping circuit, and an output terminal of the chopping circuit anomaly detection circuit is connected to the underwater power supply digital signal controller.

Further, the shore power supply module outputs a high current direct current with a 36V low-voltage constant voltage.

Further, the underwater power supply main circuit unit includes a first resistor, a first capacitor, a second capacitor, a third capacitor, a first diode, a second diode, a first inductor, a hall sensor and a first IGBT transistor.

A positive electrode of an output power supply is respectively connected to one terminal of the first resistor and a collector of the first IGBT transistor; another terminal of the first resistor is connected to one terminal of the first capacitor. Another terminal of the first capacitor is respectively connected to an emitter of the first IGBT transistor, a negative electrode of the first diode, one terminal of the second capacitor and a positive electrode of the second diode; and a negative electrode of the second diode is connected to the torch. A negative electrode of the input power supply is respectively connected to a positive electrode of the first diode and one terminal of the first inductor after through a collected terminal of the hall sensor; and another terminal of the first inductor is respectively connected to one terminal of the third capacitor and the workpiece to be welded. Another terminal of the second capacitor and another terminal of the third capacitor are grounded; and a gate of the first IGBT transistor is connected to the chopping driving circuit.

Further, the booster circuit includes a second resistor, a second inductor, a relay, a third diode, a fourth diode, a fourth capacitor, an electrolytic capacitor, and a second IGBT transistor.

A positive electrode of the power supply is connected to one terminal of the second resistor; another terminal of the second resistor is connected to one terminal of contacts of the relay; another terminal of the contacts of the relay is connected to one terminal of the second inductor; and another terminal of the second inductor is respectively connected to a positive electrode of the third diode and a collector of the second IGBT transistor. A negative electrode of the third diode is respectively connected to a positive electrode of the electrolytic capacitor, one terminal of the fourth capacitor and a positive electrode of the fourth diode; a negative electrode of the fourth diode is connected to the torch; a negative electrode of the input power supply is respectively connected to an emitter of the second IGBT transistor, a negative electrode of the electrolytic capacitor, another terminal of the fourth capacitor and the workpiece to be welded; and both a gate of the second IGBT transistor and two terminals of coils of the relay are connected to the chopping driving circuit.

The present disclosure further discloses a method for operating a split-type multifunctional underwater arc welding power supply. The method comprises as follows.

The shore power supply module outputs the input power supply after reducing the voltage of the input power supply, and an output of the shore power supply module is transmitted to the underwater power supply module carried underwater.

When starting an arc striking, the control signals are generated by the underwater power supply digital signal controller to control the chopping circuit to stop operating and control the booster circuit to operate, and the booster circuit provides an arc striking voltage, such that a voltage between the torch and the workpiece is stable at the arc striking voltage.

When completing the arc striking and starting a normal welding, the control signals are generated by the underwater power supply digital signal controller to control the chopping circuit to operate and control the booster circuit to stop operating, and a normal welding voltage and a normal welding current are provided by the chopping circuit, such that the voltage between the torch and the workpiece is stable at the normal welding voltage and the normal welding current.

When a welding arc is unstable, the control signals are generated by the underwater power supply digital signal controller to control the booster circuit and the chopping circuit to operate at the same time, and an arc stabilizing voltage is provided by the booster circuit, such that the arc between the torch and the workpiece is stable.

Further, a control signal of the chopping circuit is a PWM wave, an on-off of an IGBT transistor in the chopping circuit is controlled by the control signal in the form of PWM wave, to adjust a voltage and current of an electrical energy transmitted by the shore power supply module, such that the voltage and current between the torch and the workpiece are stable at the normal welding voltage and the normal welding current.

The control signals for the booster circuit include an enable control signal and a PWM wave control signal. An actuation state of the relay in the booster circuit is controlled by the enable control signal to control an operating state of the booster circuit. An on-off of a switch transistor in the booster circuit is controlled by the control signal in the form of PMW wave, to adjust the voltage of the electrical energy transmitted by the shore power supply module to generate the arc striking voltage and the arc stabilizing voltage.

Further, an underwater power supply control unit controls a PWM duty cycle output by an underwater power supply digital signal controller based on a signal fed back by a hall sensor in the chopping circuit to enable an operating voltage and an operating current of the torch to keep stable.

Beneficial effects of the present disclosure lie in the following.

The present disclosure conducts a split-type design to an integrated arc welding power source that are directly arranged on a shore in the prior art, which is capable of implementing real-time adjustments of welding states during an underwater welding.

The present disclosure utilizes a shore power supply module to reduce the voltage of the input power supply, and an output power supply is a high current direct current with 36V low-voltage constant voltage. When the high current direct current with 36V low-voltage constant voltage is transmitted between the shore power supply module and the underwater power supply module, it is capable of effectively reducing electric shocks for the operators underwater.

The underwater power supply main circuit unit provided by the present disclosure has a simple topology structure and fewer power assemblies, greatly reducing a volume and a weight of a submersible sealed box, being convenient for underwater operators to carry around, and greatly shortening distances of closed-loop response control circuit of an underwater arc welding power supply. Meanwhile, a digital control circuit is adopted by the chopping circuit, whose hardware circuit design is more simple, to significantly improve a dynamic response speed (response speed<100 us) and control accuracy of the arc welding power source, resulting in excellent dynamic properties of the arc welding power source.

The booster circuit provided by the present disclosure is capable of providing a relatively higher voltage temporarily during the arc striking and providing an arc stabilizing voltage temporarily when an arc is unstable, which improve a success rate of the arc striking and enable a stability during a welding process.

BRIEF DESCRIPTION OF THE DRAWINGS

The features and advantages of the present disclosure will be more clearly to be understood by referring to the accompanying drawings, and the accompanying drawings are illustrative and should not be understood as any limitations to the present disclosure. The accompanying drawings are as follows.

DESCRIPTION OF THE EMBODIMENTS

In order to make the objectives, technical solutions and advantages of the present disclosure to be more clear, the present disclosure will be clearly and completely clarified below in conjunction with the accompanying drawings of the embodiments. Obviously, the described embodiments are a part of the embodiments of the present disclosure and not to be all the embodiments. Based on the embodiments of the present disclosure, all other embodiments obtained by a person skilled in the art without making inventive fall within the protection scope of the present disclosure.

Figure 1:
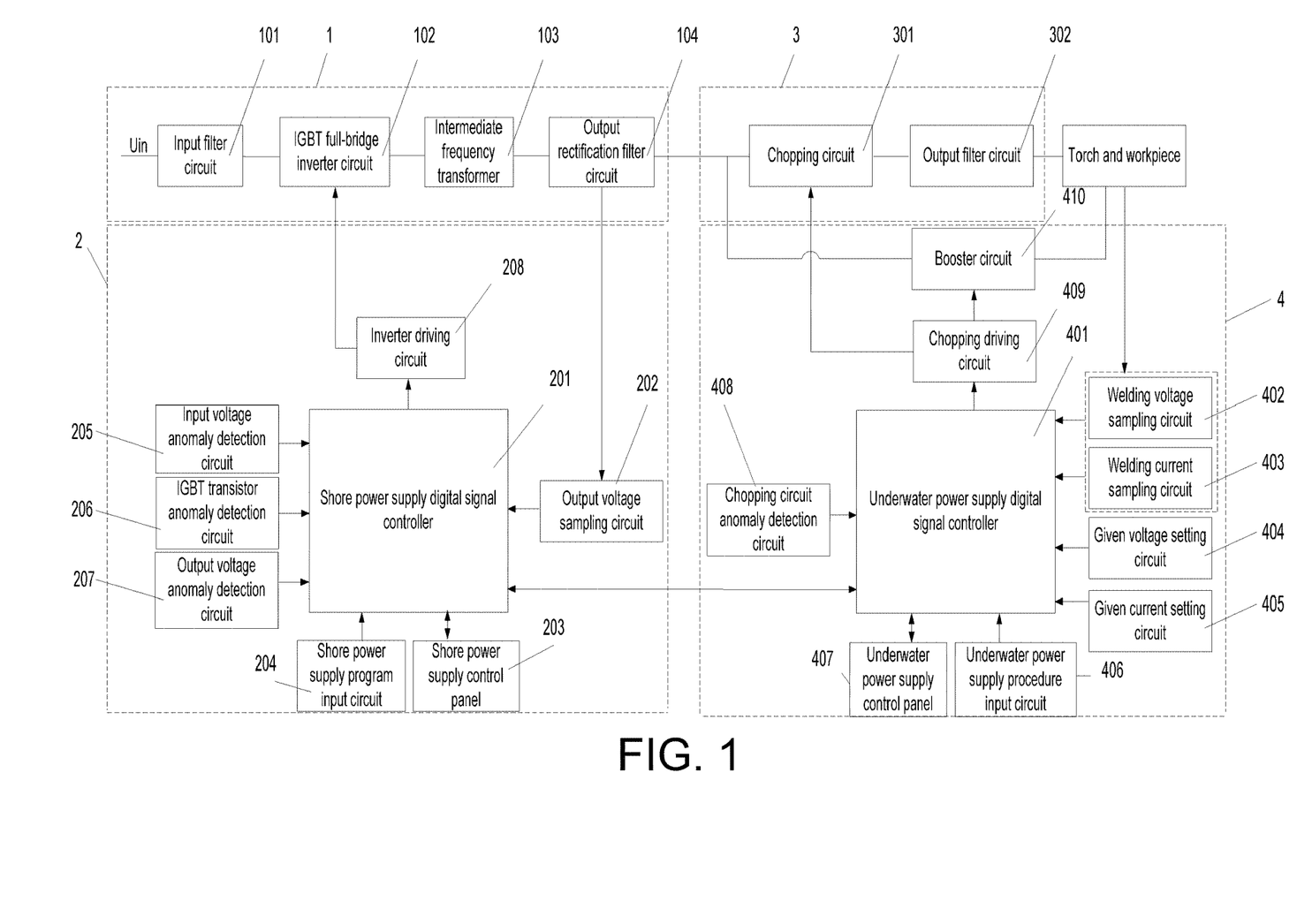
FIG. 1 illustrates a schematic diagram of circuit modules in a specific embodiment of the present disclosure.

As illustrated in FIG. 1, the embodiments of the present disclosure provide a split-type multifunctional underwater arc welding power source. The power supply includes a shore power supply module and an underwater power supply module.

The shore power supply module includes a shore power supply main circuit unit 1 and a shore power supply control unit 2.

The shore power supply main circuit unit 1 includes an input filter circuit 101, an IGBT full-bridge inverter circuit 102, an intermediate frequency transformer 103, and an output rectification filter circuit 104.

The shore power supply control unit 2 includes a shore power supply digital signal controller 201, an inverter driving circuit 208, an output voltage sampling circuit 202, a shore power supply procedure input circuit 204 and a shore power supply control panel 203.

The underwater power supply module includes an underwater power supply main circuit unit 3 and an underwater power supply control unit 4.

The underwater power supply main circuit 3 includes a chopping circuit 301 and an output filtering circuit 302.

The underwater supply control unit 4 includes an underwater power supply digital signal controller 401, a booster circuit 410, a chopping driving circuit 409, a welding voltage sampling circuit 402, a welding current sampling circuit 403, a given voltage setting circuit 404 and a given current setting circuit 405, an underwater power supply procedure input circuit 406 and an underwater power supply control panel 407.

The shore power supply module is arranged on a shore, and the underwater power supply module is carried underwater.

An input power supply Uin, the input filter circuit 101, the IGBT full-bridge inverter circuit 102, and the intermediate frequency transformer 103 and the output rectification filter circuit 104 are connected in series in turn. The output rectification filter circuit 104 is connected to an input terminal of the output voltage sampling circuit 202, and an output terminal of the output voltage sampling circuit 202 is connected to the shore power supply digital signal controller 201. An output terminal for control signals of the shore power supply digital signal controller 201 is connected to an input terminal of the inverter driving circuit 208, an output terminal of the inverter driving circuit 208 is connected to a controlled terminal of the IGBT full-bridge inverter circuit 102; an output terminal of the output rectification filter circuit 104 is respectively connected to an input terminal of the chopping circuit 301 and an input terminal of the booster circuit 410. An output terminal of the shore power supply procedure input circuit 204 and an output terminal of the shore power supply control panel 203 are connected to the shore power supply digital signal controller 201.

The IGBT full-bridge inverter circuit 102 of the shore power supply main circuit unit 1 is controlled by the shore power supply digital signal controller 201 to regulate an output voltage of the shore power supply main circuit unit 1 and to reduce a voltage of an input power supply, and the output is a high current direct current with 36V low-voltage constant voltage.

An output terminal of the chopping circuit 301 is connected to an input terminal of the output filter circuit 302, and an output terminal of the output filter circuit 302 is connected to a torch and a workpiece; an output terminal of the booster circuit 410 is connected to the torch and the workpiece; the torch and the workpiece are respectively connected to an input terminal of the welding voltage sampling circuit 402 and an input terminal of the welding current sampling circuit 403. An output terminal of the welding voltage sampling circuit 402, an output terminal of the welding current sampling circuit 403, an output terminal of the given voltage setting circuit 404 and an output terminal of the given current setting circuit 405 are all connected to the underwater power supply digital signal controller 401. The output terminal for control signals of the underwater power supply digital signal controller 401 is connected to an input terminal of the chopping driving circuit 409; an output terminal of the chopping driving circuit 409 is respectively connected to a controlled terminal of the chopping circuit 301 and a controlled terminal of the booster circuit 410; and the shore power supply digital signal controller 201 is communicatively connected to the underwater power supply digital signal controller 401. An output terminal of the underwater power supply procedure input circuit 406 and an output terminal of the underwater power supply control panel 407 are connected to the underwater power supply digital signal controller 401.

The operators are capable of setting the welding method through the underwater power supply control panel 407, such as: a shielded metal arc welding, a TIG welding and a gas shielded welding. The underwater power supply digital signal controller 401 regulates the output voltage and output current of the chopping circuit 301 by the chopping driving circuit 409 according to corresponding welding methods.

The shore power supply control unit 2 further includes an input voltage anomaly detection circuit 205, an IGBT transistor anomaly detection circuit 206, an output voltage anomaly detection circuit 207; an input terminal of the input voltage anomaly detection circuit 205 is connected to the input filter circuit 101; an input terminal of the IGBT transistor anomaly detection circuit 206 is connected to the IGBT full-bridge inverter circuit 102; an input terminal of the output voltage anomaly detection circuit 207 is connected to the output voltage sampling circuit 202; and the shore power supply digital signal controller 201 is respectively connected to an output terminal of the input voltage anomaly detection circuit 205, an output terminal of the IGBT transistor anomaly detection circuit 206 and an output terminal of the output voltage anomaly detection circuit 207.

The underwater power supply control unit further includes a chopping circuit 301 anomaly detection circuit; an input terminal of the chopping circuit 301 anomaly detection circuit is connected to the chopping circuit 301, and an output terminal of the chopping anomaly detection circuit is connected to the underwater power supply digital signal controller 401.

These abnormal detection results are displayed on the corresponding control panel, which is convenient for operators to make corresponding processing.

Figure 2:
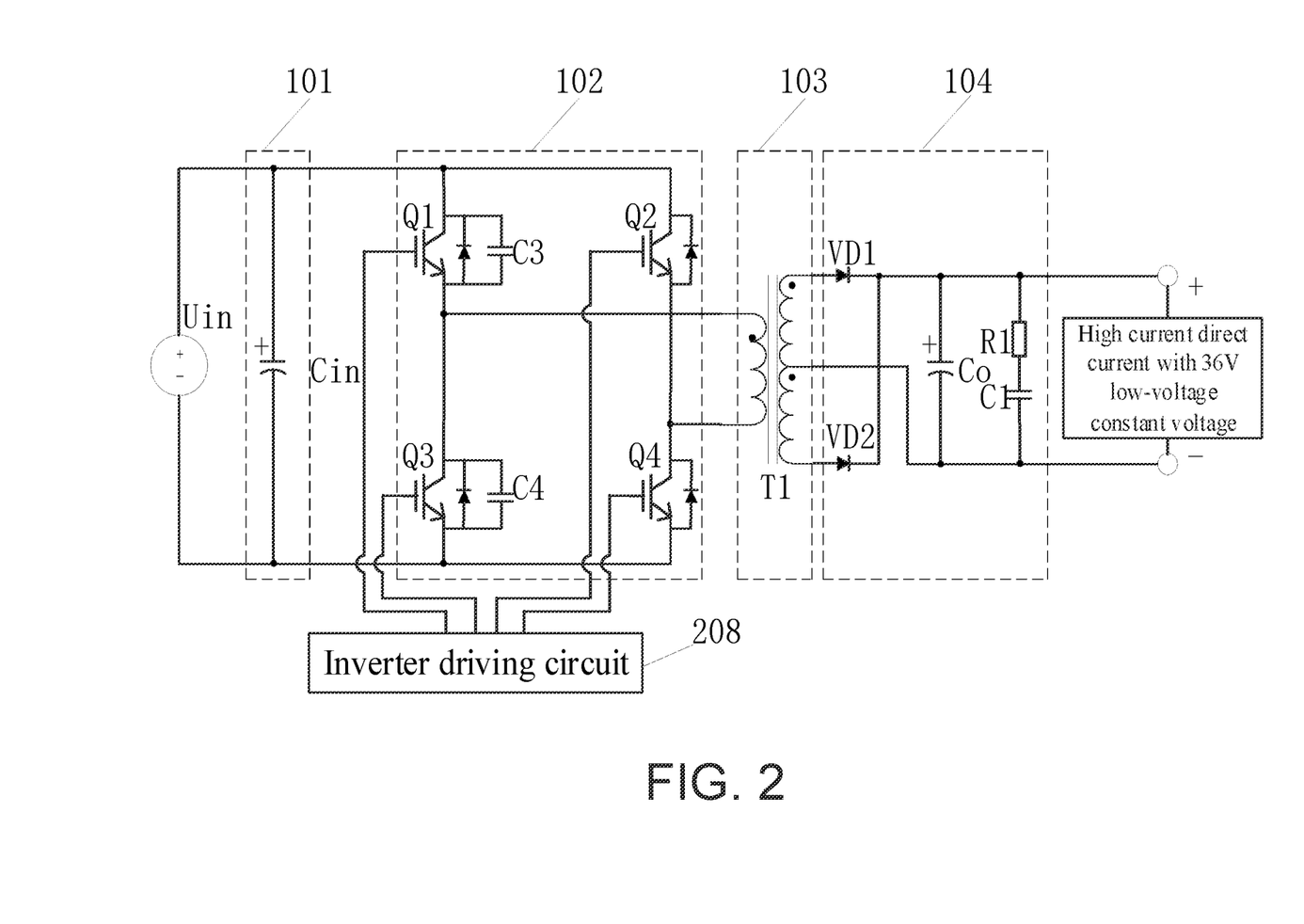
FIG. 2 illustrates a circuit diagram of a shore power supply main circuit unit in a specific embodiment of the present disclosure.

As illustrated in FIG. 2, provided is a circuit of the shore power supply main circuit unit 1. The input filter circuit 101 includes an electrolytic capacitor Cin, the IGBT full-bridge inverter circuit 102 includes an IGBT transistor Q1, an IGBT transistor Q2, an IGBT transistor Q3, an IGBT transistor Q4, a capacitor C3, and a capacitor C4. The intermediate frequency transformer 103 includes an intermediate frequency transformer T1, and the output rectification filter circuit 104 includes an electrolytic capacitor Co, a capacitor C1, a resistor R1, a diode VD1 and a diode VD2.

One terminal of the input power supply Uin is respectively connected with a positive electrode of the electrolytic capacitor Cin, a collector of IGBT transistor Q1, and a collector of IGBT transistor Q2. Another terminal of the input power supply Uin is respectively connected with a negative electrode of the electrolytic capacitor Cin, an emitter of the IGBT transistor Q3 and an emitter of the IGBT transistor Q4. One terminal of the primary stage for the intermediate frequency transformer T1 is respectively connected to the emitter of IGBT transistor Q1 and the collector of IGBT transistor Q3, and another terminal of the primary stage is respectively connected to the emitter of IGBT transistor Q2 and the collector of IGBT transistor Q4. The capacitor C3 is connected in parallel between the collector and the emitter of the IGBT transistor Q1, and the capacitor C4 is connected in parallel between the collector and the emitter of the IGBT transistor Q3. The gates of all IGBT transistors are connected to the inverter driving circuit 208. One terminal of the secondary stage for the intermediate frequency transformer T1 is connected to the positive electrode of the diode VD1, another terminal of the secondary stage is connected to the positive electrode of the diode VD2, and the intermediate tap of the secondary stage is respectively connected to the negative electrode of the electrolytic capacitor Co, one terminal of the capacitor C1, and the negative electrode of the high current direct current with 36V low-voltage constant voltage. The negative electrode of the diode VD1 is respectively connected with the negative electrode of the diode VD2, the positive electrode of the electrolytic capacitor Co, one terminal of the resistor R1 and the positive electrode of the high current direct current with 36V low-voltage constant voltage. Another terminal of the resistor R1 to is connected to another terminal of the capacitor C1.

As an input stage of the split-type multifunctional underwater arc welding power supply, the shore power supply main circuit unit 1 conducts an input filtering, a full bridge inversion, a transformer isolation and a voltage reduction to output rectification filtering to the high-voltage direct current, which completes a conversion process of DC-AC-DC and provides the chopping circuit 301 with the high current direct current with 36V low-voltage constant voltage for input. The shore power supply main circuit unit 1 outputs a relatively high-quality direct current through the input filtering circuit 101; then the high-voltage direct current completes a conversation of the direct current to a high-frequency alternating current through the IGBT full-bridge inverter circuit 102; eventually, the high-frequency alternating current is isolated and reduced the voltage through the high-frequency transformer 103, and then converted into the direct current through the output rectification filter circuit 104, so as to output a stable and reliable high current direct current with 36V low-voltage constant voltage.

Figure 3:
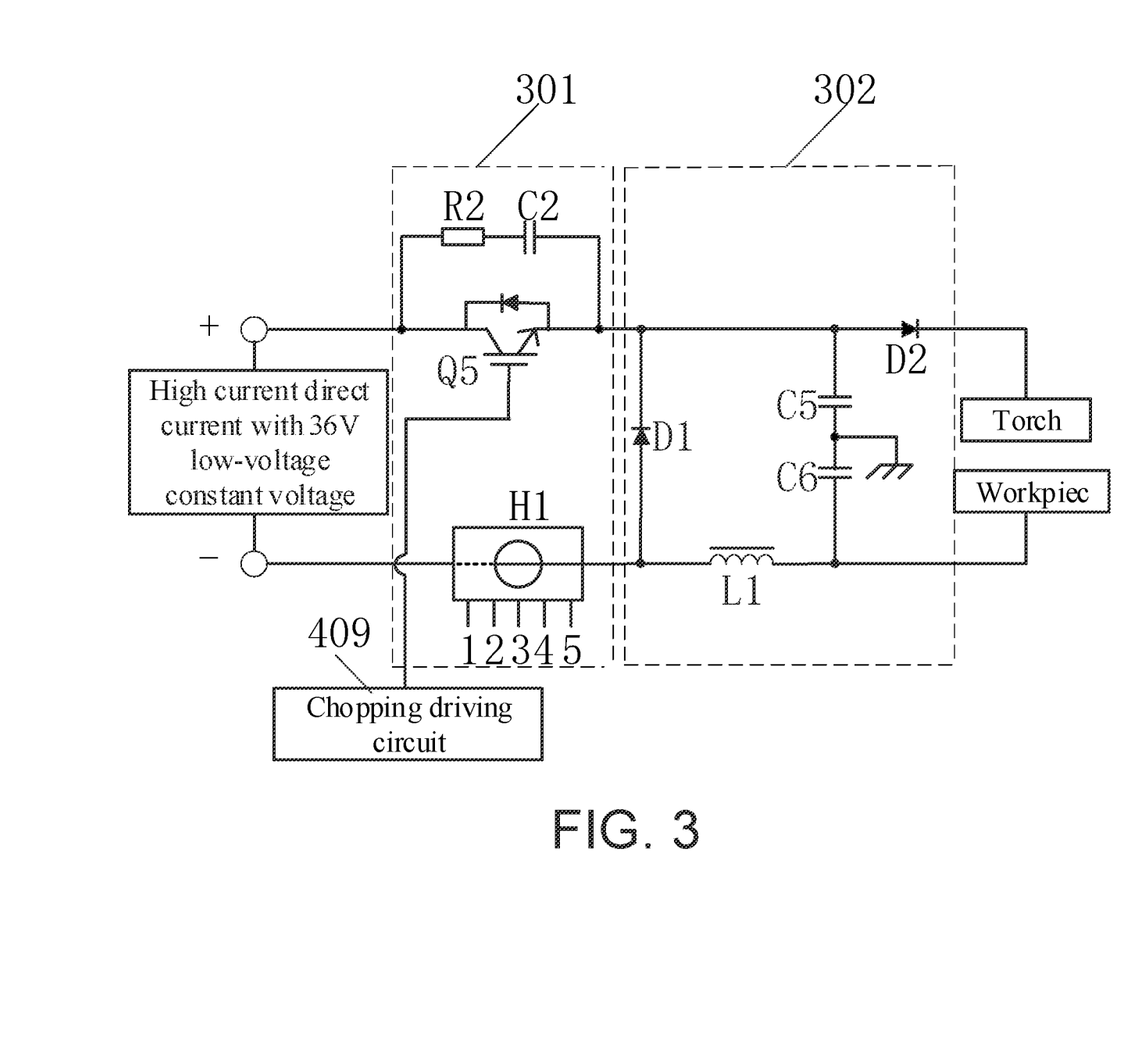
FIG. 3 illustrates a circuit diagram of an underwater power supply main circuit unit in a specific embodiment of the present disclosure.

As illustrated in FIG. 3, provided is the underwater power supply main circuit unit 3. The chopping circuit 301 includes a resistor R2, a capacitor C2, an IGBT transistor Q5 and a hall sensor H1. The output filtering circuit 302 includes a capacitor C5, a capacitor C6, a diode D1, a diode D2 and an inductor L1.

The positive electrode of the high current direct current with 36V low-voltage is respectively connected to one terminal of the resistor R2 and the collector of the IGBT transistor Q5. Another terminal of the resistor R2 is connected to one terminal of the capacitor C2. Another terminal of capacitor C2 is respectively connected to the emitter of the IGBT transistor Q5, the negative electrode of the diode D1, one terminal of the capacitor C5 and the positive electrode of the diode D2. The negative electrode of the diode D2 is connected to the torch. The negative electrode of the high current direct current with 36V low-voltage is connected to the positive electrode of the diode D1 and one terminal of the inductor L1 after passing through the acquisition terminal of the hall sensor H1. Another terminal of the inductor L1 is respectively connected to one terminal of the capacitor C6 and the workpiece to be welded. Another terminal of the capacitor C5 and another terminal of the capacitor C6 are grounded. The gate of the IGBT transistor Q5 is connected to the chopping driving circuit 409.

The underwater power digital signal controller 401 samples, regulates, and isolates the welding voltage and the welding current signal through the welding voltage sampling circuit 402 and the welding current sampling circuit 403 respectively. Then, an incremental PI operation are conducted on the voltage signal and current signal given by the given voltage setting circuit 404 and the given current setting circuit 405. The duty cycle of the IGBT transistor Q5 are adjusted in real-time through the chopping driving circuit 409 to such that the output of the underwater power supply main circuit unit 3 possesses the external properties, dynamic properties and adjustment properties required by the shielded metal arc welding, the TIG welding and the gas shielding welding. The control expression for the incremental PI control is that $$u(k) = K_p[e(k) - e(k-1)] + K_i \sum_{j=0}^{k} e(j)$$

where k represents a sampling sequence number, k=0, 1, 2 . . . u(k) represents a control deviation value output by the k-th sampling; e(k) represents a deviation value input by the k-th sampling; e(k-1) represents a deviation value input by the k-1-th sampling; $K_p$ represents a proportional coefficient; and $K_i$ represents an integration coefficient. The incremental PI control algorithm is simple and the parameter adjustment thereof is easy. The values for $K_p$ and $K_i$ are obtained by conducting an optimized design based on a large number of experiments.

Figure 4:
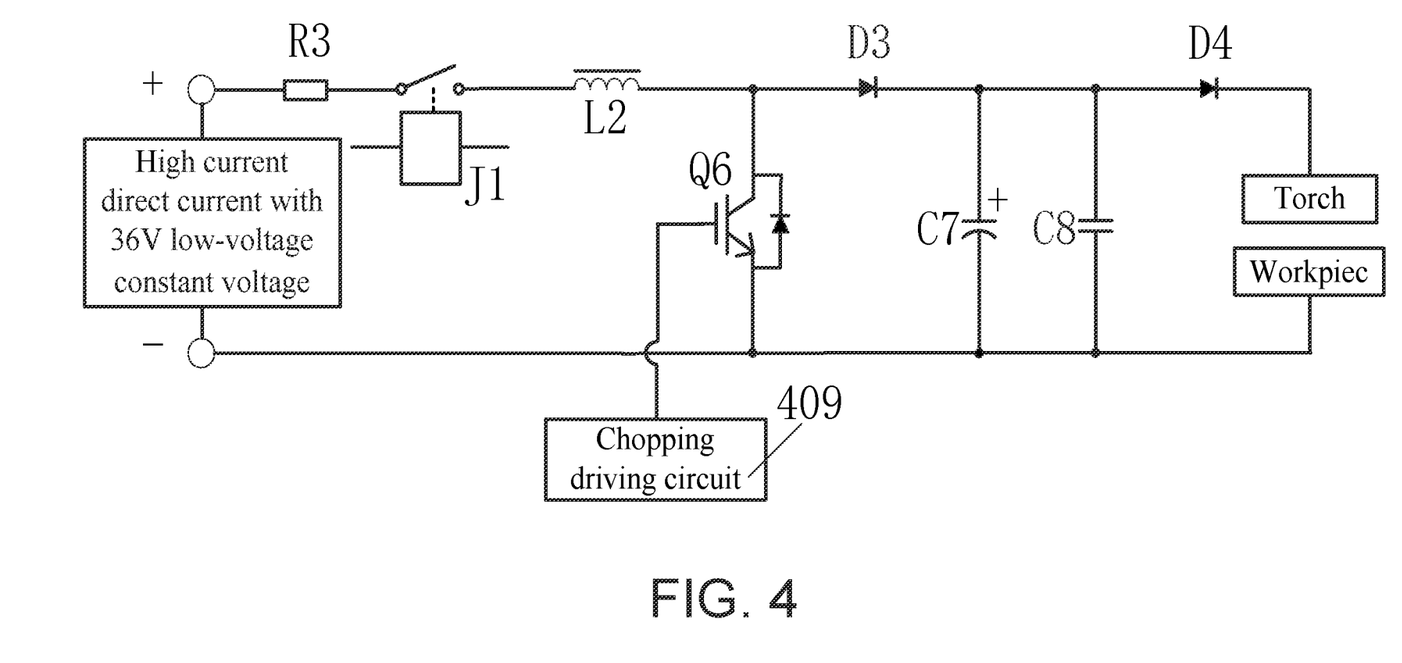
FIG. 4 illustrates a circuit diagram of a booster circuit in a specific embodiment of the present disclosure.

As illustrated in FIG. 4, the booster circuit 410 includes a resistor R3, an inductor L2, a relay J1, a diode D3, a diode D4, a capacitor C8, an electrolytic capacitor C7 and a switch transistor Q6.

The positive electrode of the high current direct current with 36V low-voltage is connected to one terminal of the resistor R3. Another terminal of the resistor R3 is connected to one terminal of the contacts of the relay J1; another terminal of the contacts of the relay J1 is connected to one terminal of the inductor L2. Another terminal of the inductor L2 is respectively connected to the positive electrode of the diode D3 and the collector of the switch transistor Q6. The negative electrode of the diode D3 is respectively connected with the positive electrode of the electrolytic capacitor C7, one terminal of the capacitor C8 and the positive electrode of the diode D4. The negative electrode of the diode D4 is connected to the torch. The negative electrode of the high current direct current with 36V low-voltage is respectively connected with the emitter of the switch transistor Q6, the negative electrode of the electrolytic capacitor C7, another terminal of the capacitor C8 and the workpiece to be welded.

The gate of the switch transistor Q6 and both terminals of the coil of the relay J1 are all connected to the chopping driving circuit 409.

The input terminal of the booster circuit 410 is connected to the high current direct current with 36V low-voltage through wires. After booster operations, the arc striking voltage and the arc stabilizing voltage required for the welding are obtained, and the output terminal of the booster circuit 410 is respectively connected to the torch and the workpiece.

A method for operating a split-type multifunctional underwater arc welding power supply provided by the specific embodiments of the present disclosure includes the following.

The shore power supply module reduces a voltage of the input power supply and then outputs the input power supply, and an output of the shore power supply module is transmitted to the underwater power supply module carried underwater.

When starting an arc striking, the control signals are generated by the underwater power supply digital signal controller 401 to control the chopping circuit 301 to stop operating and control the booster circuit 410 to operate, and the booster circuit 410 provides an arc striking voltage, such that the voltage between the torch and the workpiece is stable at the arc striking voltage.

The chopping circuit 301 is merely capable of providing a lower voltage and is not capable of satisfying requirements for the arc striking voltage. Thus, during the arc striking process, the operation of the chopping circuit 301 can be stopped, and only a higher voltage provided by the booster circuit 410 can improve the success rate for the arc striking, for example, the arc striking voltage is 80V.

When the arc striking is completed and a normal welding is started, the control signals are generated by the underwater power supply digital signal controller 401 to control the chopping circuit 301 to operate and control the booster circuit 410 to stop operating, and a normal welding voltage and a normal welding current are provided by the chopping circuit 301, such that the voltage between the torch and the workpiece is stable at the normal welding voltage and the normal welding current.

The control signal of the chopping circuit 301 is a PWM wave. During the welding process, the distance between the torch and the workpiece to be welded may occur fluctuation, resulting in fluctuations of the welding voltage. The underwater power supply control unit 4 is also capable of controlling the duty cycle of the PWM wave output by the underwater power supply digital signal controller 401 and adjusting the on-off of the IGBT transistor in the chopping circuit 301 based on the signal fed back from the hall sensor H1 in the chopping circuit 301, to adjust the voltage and the current of the electrical energy transmitted by the shore power supply module, such that the voltage between the torch and the workpiece is stable at the normal welding voltage and the normal welding current.

When a welding arc is unstable, the control signals are generated by the underwater power supply digital signal controller 401 to control the booster circuit 410 and the chopping circuit 301 to operate at the same time, and an arc stabilizing voltage is provided by the booster circuit 410, such that the arc between the torch and the workpiece is stable.

The control signals of the booster circuit 410 include an enable control signal and a PWM wave control signal. An actuation state of an relay J1 in the booster circuit 410 is controlled by the enable control signal to control an operating state of the booster circuit 410. The on-off of a switch transistor Q6 in the booster circuit 410 is controlled by the control signal in the form of PMW wave, to adjust the voltage of the electrical energy transmitted by the shore power supply module to generate the arc striking voltage and the arc stabilizing voltage.

For example, when the operators sets the welding current of the shielded metal arc welding as 200 A, according to the formula U=20+0.04I+ΔU, where ΔU represents the correction amount of the welding voltage, and its value changes with the water depth and the welding voltage corresponding to the arc welding power source normally operating underwater can be obtained. When the welding voltage is lower than 10V+ΔU, it is determined that the welding enters the arc striking state. The underwater power supply digital signal controller 401 regulates the on-off time of the switch transistor Q6, and enables the booster circuit 410 to output a 80V arc striking voltage. When the welding voltage is higher than 28V+ΔU, it is determined that the welding arc is in an unstable state. The underwater power supply digital signal controller 401 regulates the on-off time of the switch transistor Q6, enabling the booster circuit 410 to output the arc stabilizing voltage, and the arc stabilizing voltage can be set by the operators through the control panel. When the welding voltage is between (10V to 28V)+ΔU, the arc welding power supply is in the normal working state, the relay J1 does not work, and the booster circuit 410 stops working.

Although the embodiments of the present disclosure are described in conjunction with the accompanying drawings, various modifications and variations can be made by a person skilled in the art without departing from the spirit and the scope of the present disclosure, and these various modifications and variations all fall within the scope limited by the accompanying claims.

What is claimed is:

1. A split-type multifunctional underwater arc welding power supply, comprising a shore power supply module and an underwater power supply module, wherein the shore power supply module includes a shore power supply main circuit unit and a shore power supply control unit;

the shore power supply main circuit unit includes an input filter circuit, an IGBT full-bridge inverter circuit, an intermediate frequency transformer, and an output rectification filter circuit; the shore power supply control unit includes a shore power supply digital signal controller, an inverter driving circuit, an output voltage sampling circuit;

the underwater power supply module includes an underwater power supply main circuit unit and an underwater power supply control unit;

the underwater power supply main circuit unit includes a chopping circuit, an output filtering circuit; the underwater supply control unit includes an underwater power supply digital signal controller, a booster circuit, a chopping driving circuit, a welding voltage sampling circuit, a welding current sampling circuit, a given voltage setting circuit and a given current setting circuit;

the shore power supply module is arranged on a shore, and the underwater power supply module is carried underwater; and an input power supply, the input filter circuit, the IGBT full-bridge inverter circuit, the intermediate frequency transformer and the output rectification filter circuit are sequentially connected in series; the output rectification filter circuit is connected to an input terminal of the output voltage sampling circuit, and an output terminal of the output voltage sampling circuit is connected to the shore power supply digital signal controller; an output terminal for control signals of the shore power supply digital signal controller is connected to an input terminal of the inverter driving circuit, an output terminal of the inverter driving circuit is connected to a controlled terminal of the IGBT full-bridge inverter circuit; an output terminal of the output rectification filter circuit is respectively connected to an input terminal of the chopping circuit and an input terminal of the booster circuit; an output terminal of the chopping circuit is connected to an input terminal of the output filter circuit, and an output terminal of the output filter circuit is connected to a torch and a workpiece; an output terminal of the booster circuit is connected to the torch and the workpiece; the torch and the workpiece are respectively connected to an input terminal of the welding voltage sampling circuit and an input terminal of the welding current sampling circuit; an output terminal of the welding voltage sampling circuit, an output terminal of the welding current sampling circuit, an output terminal of the given voltage setting circuit and an output terminal of the given current setting circuit are all connected to the underwater power supply digital signal controller; the output terminal for control signals of the underwater power supply digital signal controller is connected to an input terminal of the chopping driving circuit; an output terminal of the chopping driving circuit is respectively connected to a controlled terminal of the chopping circuit and a controlled terminal of the booster circuit; and the shore power supply digital signal controller is communicatively connected to the underwater power supply digital signal controller.

2. The split-type multifunctional underwater arc welding power supply according to claim 1, wherein the shore power supply control unit further includes an input voltage anomaly detection circuit, an IGBT transistor anomaly detection circuit, an output voltage anomaly detection circuit; an input terminal of the input voltage anomaly detection circuit is connected to the input filter circuit; an input terminal of the IGBT transistor anomaly detection circuit is connected to the IGBT full-bridge inverter circuit; an input terminal of the output voltage anomaly detection circuit is connected to the output voltage sampling circuit; and the shore power supply digital signal controller is respectively connected to an output terminal of the input voltage anomaly detection circuit, an output terminal of the IGBT transistor anomaly detection circuit and an output terminal of the output voltage anomaly detection circuit.

3. The split-type multifunctional underwater arc welding power supply according to claim 1, wherein the underwater power supply control unit further includes a chopping circuit anomaly detection circuit; an input terminal of the chopping circuit anomaly detection circuit is connected to the chopping circuit, and an output terminal of the chopping circuit anomaly detection circuit is connected to the underwater power supply digital signal controller.

4. The split-type multifunctional underwater arc welding power supply according to claim 1, wherein the shore power supply module outputs a high current direct current with a 36V low-voltage constant voltage.

5. The split-type multifunctional underwater arc welding power supply according to claim 1, wherein the underwater power supply main circuit unit includes a first resistor, a first capacitor, a second capacitor, a third capacitor, a first diode, a second diode, a first inductor, a hall sensor and a first IGBT transistor; and  a positive electrode of an output power supply is respectively connected to one terminal of the first resistor and a collector of the first IGBT transistor; another terminal of the first resistor is connected to one terminal of the first capacitor; another terminal of the first capacitor is respectively connected to an emitter of the first IGBT transistor, a negative electrode of the first diode, one terminal of the second capacitor and a positive electrode of the second diode; a negative electrode of the second diode is connected to the torch; a negative electrode of the input power supply is respectively connected to a positive electrode of the first diode and one terminal of the first inductor after through a collected terminal of the hall sensor; another terminal of the first inductor is respectively connected to one terminal of the third capacitor and the workpiece to be welded; another terminal of the second capacitor and another terminal of the third capacitor are grounded; and a gate of the first IGBT transistor is connected to the chopping driving circuit.

6. The split-type multifunctional underwater arc welding power supply according to claim 1, wherein the booster circuit includes a second resistor, a second inductor, a relay, a third diode, a fourth diode, a fourth capacitor, an electrolytic capacitor, and a second IGBT transistor; and  a positive electrode of the power supply is connected to one terminal of the second resistor; another terminal of the second resistor is connected to one terminal of contacts of the relay; another terminal of the contacts of the relay is connected to one terminal of the second inductor; another terminal of the second inductor is respectively connected to a positive electrode of the third diode and a collector of the second IGBT transistor; a negative electrode of the third diode is respectively connected to a positive electrode of the electrolytic capacitor, one terminal of the fourth capacitor and a positive electrode of the fourth diode; a negative electrode of the fourth diode is connected to the torch; a negative electrode of the input power supply is respectively connected to an emitter of the second IGBT transistor, a negative electrode of the electrolytic capacitor, another terminal of the fourth capacitor and the workpiece to be welded; and both a gate of the second IGBT transistor and two terminals of coils of the relay are connected to the chopping driving circuit.

7. A method for operating a split-type multifunctional underwater arc welding power supply, which is adapted to the split-type multifunctional underwater arc welding power supply according to claim 1, wherein the method for operating the split-type multifunctional underwater arc welding power supply comprises:

outputting, through the shore power supply module, the input power supply after reducing a voltage of the input power supply, and transmitting an output of the shore power supply module to the underwater power supply module carried underwater;

generating, by the underwater power supply digital signal controller, the control signals, to control the chopping circuit to stop operating and control the booster circuit to operate, and providing, by the booster circuit, an arc striking voltage, such that a voltage between the torch and the workpiece is stable at the arc striking voltage, when starting an arc striking;

generating, by the underwater power supply digital signal controller, the control signals, to control the chopping circuit to operate and control the booster circuit to stop operating, and providing, by the chopping circuit, a normal welding voltage and a normal welding current, such that the voltage between the torch and the workpiece is stable at the normal welding voltage and the normal welding current, when completing the arc striking and starting a normal welding; and  generating, by the underwater power supply digital signal controller, the control signals, to control the booster circuit and the chopping circuit to operate at a same time, and providing, by the booster circuit, an arc stabilizing voltage, such that the arc between the torch and the workpiece is stable, when a welding arc is unstable.

8. The method for operating the split-type multifunctional underwater arc welding power supply according to claim 7, wherein a control signal of the chopping circuit is a PWM wave, an on-off of an IGBT transistor in the chopping circuit is controlled by the control signal in a form of PWM wave, to adjust a voltage and current of an electrical energy transmitted by the shore power supply module, such that the voltage and current between the torch and the workpiece are stable at the normal welding voltage and the normal welding current; and  control signals for the booster circuit include an enable control signal and a PWM wave control signal, an actuation state of the relay in the booster circuit is controlled by the enable control signal, to control an operating state of the booster circuit; an on-off of a switch transistor in the booster circuit is controlled by the control signal in the form of PMW wave, to adjust the voltage of the electrical energy transmitted by the shore power supply module to generate the arc striking voltage and the arc stabilizing voltage.

9. The method for operating the split-type multifunctional underwater arc welding power supply according to claim 8, wherein the underwater power supply control unit controls a PWM duty cycle output by the underwater power supply digital signal controller based on a signal fed back by a hall sensor in the chopping circuit to enable an operating voltage and an operating current of the torch to keep stable.

\* \* \* \* \*